US012076808B2

(12) United States Patent
Stratakis et al.

(10) Patent No.: US 12,076,808 B2
(45) Date of Patent: Sep. 3, 2024

(54) USING LASERS TO REDUCE REFLECTION OF TRANSPARENT SOLIDS, COATINGS AND DEVICES EMPLOYING TRANSPARENT SOLIDS

(71) Applicant: FOUNDATION FOR RESEARCH AND TECHNOLOGY HELLAS, Heraklion (GR)

(72) Inventors: Emmanouil Stratakis, Heraklion Crete (GR); Evangelos Skoulas, Heraklion Crete (GR); Antonios Papadopoulos, Heraklion Crete (GR)

(73) Assignee: BIOMIMETIC PRIVATE COMPANY, Heraklion (GR)

( * ) Notice: Subject to any disclaimer, the term of this patent is extended or adjusted under 35 U.S.C. 154(b) by 518 days.

(21) Appl. No.: 16/970,256

(22) PCT Filed: Feb. 28, 2018

(86) PCT No.: PCT/GR2018/000010
§ 371 (c)(1),
(2) Date: Aug. 14, 2020

(87) PCT Pub. No.: WO2019/166836
PCT Pub. Date: Sep. 6, 2019

(65) Prior Publication Data
US 2021/0138577 A1    May 13, 2021

(51) Int. Cl.
*B23K 26/00*    (2014.01)
*B23K 26/0622*    (2014.01)
(Continued)

(52) U.S. Cl.
CPC ...... *B23K 26/0006* (2013.01); *B23K 26/0624* (2015.10); *B23K 26/082* (2015.10);
(Continued)

(58) Field of Classification Search
CPC ............ B23K 26/0006; B23K 26/0624; B23K 26/082; B23K 26/354; B23K 26/0861;
(Continued)

(56) References Cited

U.S. PATENT DOCUMENTS 5,641,416 A * 6/1997 Chadha ................ B23K 26/389
438/20
7,796,317 B2    9/2010 Iwase
(Continued)

FOREIGN PATENT DOCUMENTS

CN    101175599 A    5/2008
CN    106 526 716 A    3/2017
(Continued)

OTHER PUBLICATIONS

International Search Report dated Jun. 11, 2018.
(Continued)

*Primary Examiner* — Janie M Loeppke
*Assistant Examiner* — Simpson A Chen
(74) *Attorney, Agent, or Firm* — Brooke Schumm, III; Manolis Samuelides, Eur. Pat. Agt.

(57) ABSTRACT

Method and devices using lasers to reduce reflection of transparent solids in the optical spectrum, coatings and devices employing transparent solids are disclosed. The lasers are used to shape surfaces of the transparent solid materials by raising the temperature of the material to around the melting temperature, and thereby generate desired target nanostructure two-dimensional antireflection pattern arrays on the surfaces. The laser fluence value, wavelength, repetition rate, pulse duration and number of consecutive laser pulses per focus spot are selected, and a desired focus spot distribution on the surface of the transparent solid material is identified. The transparent solid (Continued)

material is relatively translated to generate the desired nanostructure two-dimensional pattern array.

7 Claims, 8 Drawing Sheets

(51) Int. Cl.
| | |
|---|---|
| B23K 26/08 | (2014.01) |
| B23K 26/082 | (2014.01) |
| B23K 26/352 | (2014.01) |
| B23K 26/354 | (2014.01) |
| B23K 101/36 | (2006.01) |
| B82Y 40/00 | (2011.01) |
| G02B 1/118 | (2015.01) |
| G02B 1/12 | (2006.01) |

(52) U.S. Cl.
CPC ........ *B23K 26/0861* (2013.01); *B23K 26/354* (2015.10); *B23K 26/3568* (2018.08); *B23K 26/3584* (2018.08); *B82Y 40/00* (2013.01); *G02B 1/118* (2013.01); *G02B 1/12* (2013.01); *B23K 2101/36* (2018.08)

(58) Field of Classification Search
CPC ............ B23K 2101/36; B23K 2103/54; B23K 26/3568; B23K 26/3584; G02B 1/118; G02B 1/12
USPC ...................................................... 219/121.6
See application file for complete search history.

(56) References Cited

U.S. PATENT DOCUMENTS

| | | | |
|---|---|---|---|
| 8,995,029 B2 | 3/2015 | Shah et al. | |
| 2009/0103181 A1 | 4/2009 | Iwase | |
| 2010/0301025 A1 | 12/2010 | Iwase | |
| 2012/0328905 A1* | 12/2012 | Guo | B23K 26/0006 428/141 |
| 2013/0209926 A1 | 8/2013 | Oshemkov et al. | |
| 2014/0063609 A1 | 3/2014 | Iwata et al. | |
| 2014/0185065 A1* | 7/2014 | Shah | G06K 15/1209 358/1.7 |
| 2016/0233399 A1* | 8/2016 | Maki | H01L 25/0753 |
| 2018/0143352 A1 | 5/2018 | Zha | |

FOREIGN PATENT DOCUMENTS

| | | |
|---|---|---|
| JP | 2014133263 A | 7/2014 |
| WO | WO 2006123835 A1 | 11/2006 |
| WO | WO 2013/030343 | 3/2013 |
| WO | WO2013030343 A1 | 3/2013 |
| WO | WO 2016/016670 A1 | 2/2016 |
| WO | WO 2016 207659 A1 | 12/2016 |

OTHER PUBLICATIONS

Meng G et al: "Dual-scale nanoripple/nanoparticle-covered microspikes on silicon by femtosecond double pulse train irradiation in water", Applied Surface Science, Elsevier, Amsterdam, HKL, vol. 410, Mar. 9, 2017, pp. 22-28.

Brahm A., "Laser-generated broadband antireflection structures for freeform silicon lenses at terahertz frequencies," Applied Optics, Optical Society of America, vol. 53, No. 13, pp. 2886-2891 (Washington, DC) May 1, 2014.

Diez M. et al, "Selective Laser Ablation of Thin Dielectrics on Solar Cells," 26th European International Conference on Photovoltaic Solar Energy, Sep. 5-9, pp. 1080-1088, Jan. 1, 2019.

Brahm, A., "Laser-generated broadband antireflection structures for freeform silicon lenses at terahertz frequencies," Applied Optics, vol. 53, No. 14, pp. 2886-2891 (Optica Publishing Group, Washington, DC) posted Apr. 3, 2014.

Meng, G., Dual-scale nanoripple/nanoparticle-covered microspikes on silicon by femtosecond double pulse train irradiation in water, Applied Surface Science, vol. 410, pp. 22-28 (Elsevier B.V., the Netherlands, 2017) published on-line, Mar. 9, 2017.

Diez, M., et al., "Selective Laser Ablation of Thin Dielectrics on Solar Cells" 26th European Photovoltaic Solar Energy Conference and Exhibition (26th EU PVSEC) Hosted by European Environment Information and Observation Network (Eionet) part of European Energy Adminstration, Copenhagen, Denmark 2011.

Park, K et al, Nanotextured Silica Surfaces with Robust Superhydrophobicity and Omnidirectional Broadband Supertransmissivity, ACS Nano, vol. 6 No. 5, pp. 3789-3799, American Chemical Society 2012) Publ. online Apr. 8, 2012 PMID: 22482937.

* cited by examiner

USING LASERS TO REDUCE REFLECTION OF TRANSPARENT SOLIDS, COATINGS AND DEVICES EMPLOYING TRANSPARENT SOLIDS

The present disclosure relates to methods and devices for reducing reflection and more specifically to methods and devices for reducing reflection of transparent solids, as well as coatings and devices employing such transparent solids.

BACKGROUND

Antireflective coatings on transparent solids are used to improve light harvesting in solar cells or to enhance the performance of transparent media, for optoelectronic and electro-optical devices. Coatings suitable for this purpose are those that decrease the surface reflection and increase the transmittance over broad spectra of light at transparent solids.

Chemical compounds coated to transparent solids are employing one or more thin layers on the surface of interest. As a result, the coated surfaces exhibit increased antireflection properties due to the smooth increment of the surface refractive index. On the other hand, they are not environmental friendly, they produce toxic chemical waste and they are difficult to integrate on industrial scale for large surface areas, resulting to increased production costs. Another drawback of the chemical coating is the stability yields of the thin layers which can eventually cause lack of performance and degradation of the coating on the long run.

SUMMARY

The objective of this invention is to provide a simple and efficient method of producing antireflection surfaces. By processing transparent solids with lasers, (pseudo) periodical nanostructures can be produced on the surface, resulting to increased antireflection properties. The proposed technique is a one-step, chemical free technique and it can be easily integrated to industrial scale using industrial high power and repeatability lasers.

In a first aspect, a method of shaping a surface of a transparent solid material to reduce reflection in the optical spectrum is proposed. The method comprises providing the transparent solid material on a holder; identifying a desired target nanostructure two-dimensional antireflection pattern array on the surface of the transparent solid material; identifying a desired focus spot distribution on the surface of the transparent solid material; identifying a melting temperature of the transparent solid material; selecting a laser fluence value from a range of laser fluence values; selecting a wavelength, a repetition rate and a pulse duration of a laser pulse from a range of wavelengths, repetition rates and pulse durations, respectively; selecting a number of consecutive laser pulses applied per focus spot on the laser surface; exposing the surface of the transparent solid material to a focused laser radiation with the selected wavelength, repetition rate, pulse duration and number of consecutive laser pulses to raise the temperature of the transparent material to around the melting temperature to shape at least a part of the surface and generate at least part of the desired target nanostructure two-dimensional pattern array; relatively translating the transparent solid material to generate the desired nanostructure two-dimensional pattern array.

By processing the transparent solid surfaces with laser pulses self-assembly Laser Induced Periodic Surface Structures (LIPSS) may be formed. The formation of these structures results in the reduction of reflection of the transparent solid surface.

In some examples, the surface of the transparent solid material is exposed to a focused circularly polarized laser radiation. By irradiating transparent solids with circularly polarized laser radiation, nano-ripples may be formed in all directions along a—Gaussian-focus spot which eventually leads to nano-spike formation on the treated surface. Nano-spike structures are pseudo-periodic and randomly distributed along the surface. The advantage of pseudo-periodic structures is that they present anti-reflection properties in all plane directions unlike nano-ripples which tend to exhibit anti-reflection properties when the plane of incident is perpendicular to the direction of nano-ripple orientation.

In some examples, identifying a desired focus spot distribution on the surface of the transparent solid material may comprise identifying an overlap by a preselected percentage of neighboring focus spots. The preselected overlap percentage may be 89% or lower.

In some examples, the method may further comprise scanning and/or rastering the laser beam on a stationary transparent solid material. By scanning with multiple scans in high speed using a small number of pulses (e.g. three to five) per pass the material melts and resolidifies creating a very small surface roughness without any structural formation. The step may be set near to the spot diameter.

In some examples, the transparent solid material may comprise at least a glass piece. The glass piece may be on an electronic device. The electronic device may include a solar cell (SC), a display, a screen, a light emitting diode (LED) and/or a sensor.

In some examples, the wavelength of the incident beam may be selected from a range of 200 nm to 1100 nm. This may depend on the material to be shaped.

In some examples, the laser fluence may be selected in a range of 3.8 J/cm2 to 1.47 J/cm2. The repetition rate may then be selected from a range of 1 kHz to 1 MHz and the pulse duration may be selected up to 10 ps. The combination may depend on the laser fluence selected, the height of the nanostructures to be formed and the melting point of the surface material.

In another aspect, a manufacturing configuration to shape a surface of a transparent solid material to reduce reflection in the optical spectrum is disclosed. The manufacturing configuration may comprise an irradiation module. The irradiation module may have a pulsed laser source and an optical system for focusing a laser beam from the pulsed laser source. The manufacturing configuration may further comprise a holder configured to hold the transparent solid material. The manufacturing configuration may also comprise a controller to: set a laser fluence value from a range of laser fluence values; set a laser pulse wavelength, a laser pulse repetition rate and a laser pulse duration from a range of laser pulse wavelengths, repetition rates and durations, respectively; set a number of consecutive laser pulses applied per focus point spot on the laser surface; and set a relative translation sequence of the transparent solid material in a first direction during a laser exposure with a laser beam from the pulsed laser source to generate a desired nanostructure two-dimensional antireflection pattern array.

In some examples, the optical system may comprise at least a mirror to direct the laser beam from the pulsed laser source to the transparent solid material and at least a lens to focus the laser beam on the transparent solid material.

In some examples, the pulsed laser source may be a picosecond or a femtosecond laser source.

In some examples, the translation module may be configured to displace the transparent solid material holder while the irradiation module remains stationary. In other examples, the optical system may be configured to displace the laser beam while the transparent solid material holder remains stationary. In yet other examples, the translation module may be configured to displace the irradiation module while the transparent solid material holder remains stationary.

In another aspect, an antireflection transparent solid material is disclosed. The antireflection transparent solid material may be shaped using a method of shaping according examples disclosed herein and may comprise a nanostructure two-dimensional antireflection pattern array on a surface.

In yet another aspect, a device is disclosed. The device may comprise an antireflection transparent solid material according to examples disclosed herein.

In yet another aspect, a system for shaping a surface of a transparent solid material to reduce reflection in the optical spectrum of a surface of a transparent material is disclosed. The system may comprise means for providing the transparent solid material on a holder; means for identifying a desired target nanostructure two-dimensional antireflection pattern array on the surface of the transparent solid material; means for identifying a desired focus spot distribution on the surface of the transparent solid material; means for identifying a melting temperature of the transparent solid material; means for setting a laser fluence value from a range of laser fluence values; means for setting a wavelength, a repetition rate and a pulse duration of a laser pulse from a range of wavelengths, repetition rates and pulse durations, respectively; means for setting a number of consecutive laser pulses applied per focus spot on the laser surface; means for exposing the surface of the transparent solid material to a focused laser radiation with the selected wavelength, repetition rate, pulse duration and number of consecutive laser pulses to raise the temperature of the transparent material to around the melting temperature to shape at least a part of the surface and generate at least part of the desired target nanostructure two-dimensional pattern array; and means for relatively translating the transparent solid material to generate the desired nanostructure two-dimensional pattern array.

In yet another aspect, a non-transitory computer program product that causes an irradiation configuration to perform shaping a surface of a transparent solid material is disclosed. The non-transitory computer program product may have instructions to: provide the transparent solid material on a holder; identify a desired target nanostructure two-dimensional antireflection pattern array on the surface of the transparent solid material; identify a desired focus spot distribution on the surface of the transparent solid material; identify a melting temperature of the transparent solid material; select a laser fluence value from a range of laser fluence values; select a wavelength, a repetition rate and a pulse duration of a laser pulse from a range of wavelengths, repetition rates and pulse durations, respectively; select a number of consecutive laser pulses applied per focus spot on the laser surface; expose the surface of the transparent solid material to a focused laser radiation with the selected wavelength, repetition rate, pulse duration and number of consecutive laser pulses to raise the temperature of the transparent material to around the melting temperature to shape at least a part of the surface and generate at least part of the desired target nanostructure two-dimensional pattern array; relatively translate the transparent solid material to generate the desired nanostructure two-dimensional pattern array.

In yet another aspect, a computer program product is disclosed. The computer program product may comprise program instructions for causing an irradiation configuration to perform a method of shaping a surface of a transparent solid material according to examples disclosed herein.

The computer program product may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the processes.

The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant methods.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
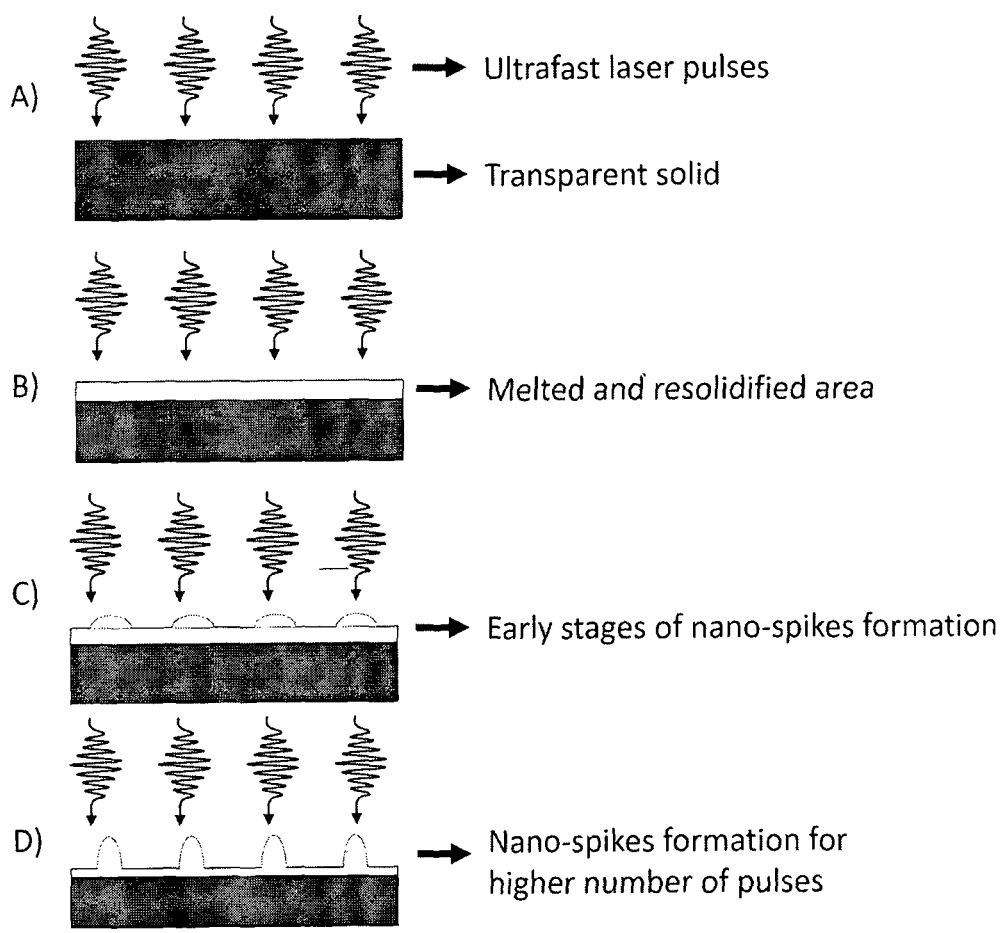
FIG. 1 schematically illustrates an evolution of nano-spike formation after multiple scans, according to an example.

FIG. 1 schematically illustrates an evolution of nano-spike formation after multiple scans, according to an example. During a first scan A ultrafast laser pulses irradiate a transparent solid. During that first pass the temperature of the solid may rise but may not reach a melting point. So no change of phase of the solid's surface may yet take place and no nanostructures may yet be formed. During a further scan B, the already hot surface may melt when the laser pulses are targeting a particular spot and resolidify as the laser beam moves away from the spot creating a very small surface roughness without any structural formation. Continuing in a next scan C the surface may be irradiated again where the roughness previously formed favours the primary formation of nano-spikes. As the scans continue, the nano-spikes may be gradually formed to their desired shape and size to provide antireflection properties to the surface. The same procedure is followed multiple times until the surface is fully and homogenously structured as shown in scan D.

Figure 2:
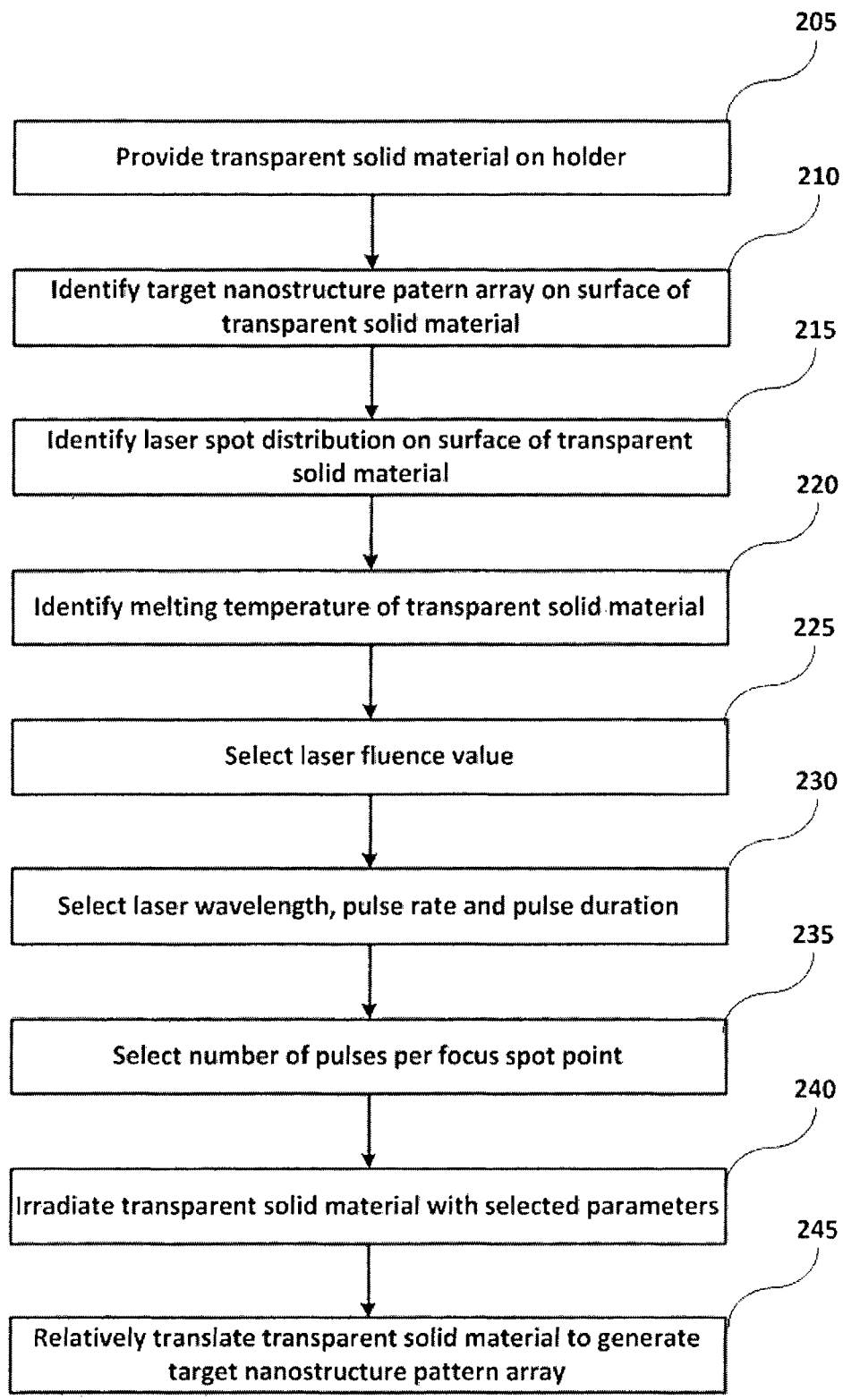
FIG. 2 is a flow diagram of a method of shaping a surface of a transparent solid material to reduce reflection in the optical spectrum, according to an example FIG. 3A schematically illustrates an scan-electron-microscope image on a shaped fused silica surface.

FIG. 2 is a flow diagram of a method of shaping a surface of a transparent solid material to reduce reflection in the optical spectrum, according to an example. In block 205, the transparent solid material is provided on a holder.

In block 210, a desired target nanostructure two-dimensional antireflection pattern array is identified on the surface of the transparent solid material. In block 215, a desired focus spot distribution on the surface of the transparent solid material is identified. In block 220, a melting temperature of the transparent solid material is identified. In block 225 a laser fluence value is selected from a range of laser fluence values. In block 230, a wavelength, a repetition rate and a pulse duration of a laser pulse are selected from a range of wavelengths, repetition rates and pulse durations, respectively. In block 235, a number of consecutive laser pulses applied per focus spot on the laser surface are selected. In block 240, the surface of the transparent solid material is exposed to a focused laser radiation with the selected wavelength, repetition rate, pulse duration and number of consecutive laser pulses to raise the temperature of the transparent material to around the melting temperature to shape at least a part of the surface and generate at least part of the desired target nanostructure two-dimensional pattern array. In block 245, the transparent solid material is relatively translated to generate the desired nanostructure two-dimensional pattern array.

Figure 3A:
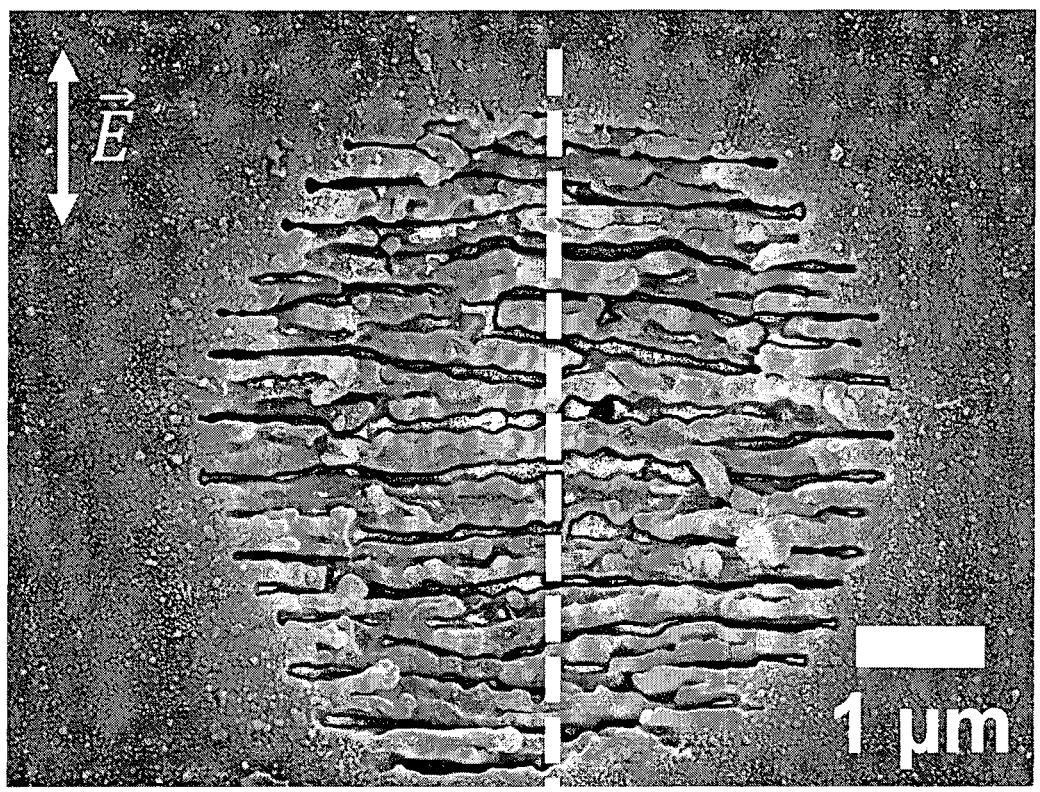
FIG. 3B schematically illustrates a pixel intensity for a cross-section of the surface of FIG. 3A.
Figure 3B:
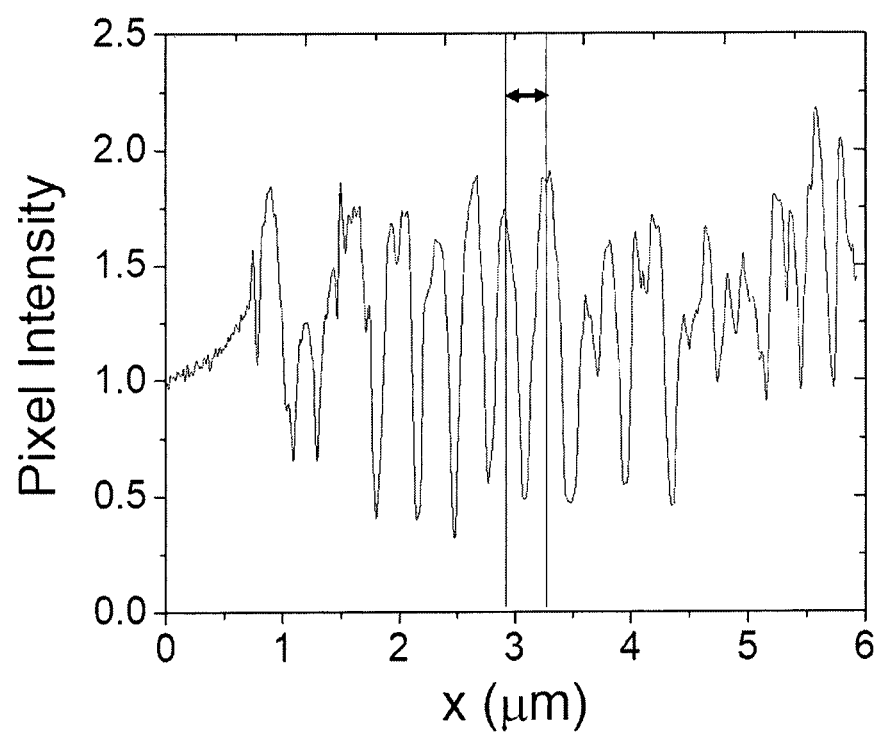

FIG. 3A schematically illustrates an scan-electron-microscope image on a shaped fused silica surface. In the example of FIG. 3A the surface is the product after irradiation at 1026 nm and 60 kHz repetition rate with linear polarization (the white double-ended arrow indicates the laser beam polarization direction), with fluence Fl=3.4 J/cm$^2$, number of pulses NP=15 and pulse duration PD=170 fs. This process results to the formation of self-assembly Laser Induced Periodic Surface Structures (LIPSS) as shown in FIG. 3A. FIG. 3B schematically illustrates a pixel intensity along a cross-section of the surface of FIG. 3A.

The periodicity of those structures is defined as the distance between two or more consecutive structures as shown in FIG. 3B. The formation of LIPSS can be described by the inhomogeneous energy absorption of a rough surface coupled with hydrodynamics accounting for the fluid motion of the molten material during and immediately after irradiation.

In nature, surface structures with size in the sub-micrometer regime can produce efficient anti-reflection properties in the visible spectrum, due to the gradual spatial increment of the refractive index, while at the same time the material remains transparent. A remarkable example is the antireflection of the butterfly's Greta Oto wings, where their surface is decorated with nanopillars at sub-micrometer size.

The key parameter for the production of anti-reflection nano-structures is the polarization state of the incident beam. By irradiating transparent solids with Gaussian shaped linear polarized ultrafast laser pulses, nano-ripples are formed on the surface, as previously described, where the direction of those structures is perpendicular to the incident electric field direction. Using circular polarization, nano-ripples are formed in all directions along the Gaussian spot which eventually leads to nano-spike formation on the treated surface. Nano-spike structures are pseudo-periodic and randomly distributed along the surface. The advantage of pseudo-periodic structures is that they present anti-reflection properties in all plane directions unlike nano-ripples which tend to exhibit anti-reflection properties when the plane of incident is perpendicular to the direction of nano-ripple orientation.

The size and the periodicity of nano-spikes can be controlled by the laser parameters. The fluence and the number of pulses have a small influence however, the size and periodicity of nano-spikes are strongly dependent on the wavelength of the incident beam. The size and periodicity of nano-spikes can eventually determine the spectral range that the structured surface will exhibit antireflective behavior. Thus, depending on the application this technique shows high versatility as the antireflective spectral range can be properly tuned.

For the production of nano-spikes on a large surface area the transparent solid is placed, fixed and leveled on a motorized x-y-z stage in order to scan the sample in lines. Alternatively a Galvo system can be used instead of a motorized stages for faster processing time. The incident beam is focused on the surface, the fluence is set near to the ablation threshold of the material and the surfaces is irradiated in lines. In the case where the focus point is below or above the surface then self-focusing condition from surface impurities may significantly damage the surface. By the term damaged surface, we refer to the case where pieces of material are detached from the surface, which leads to crater formations. Those craters increase local absorption and light scattering which eventually leads to the increment of the surface roughness and reduction of transmittance.

Figure 4:
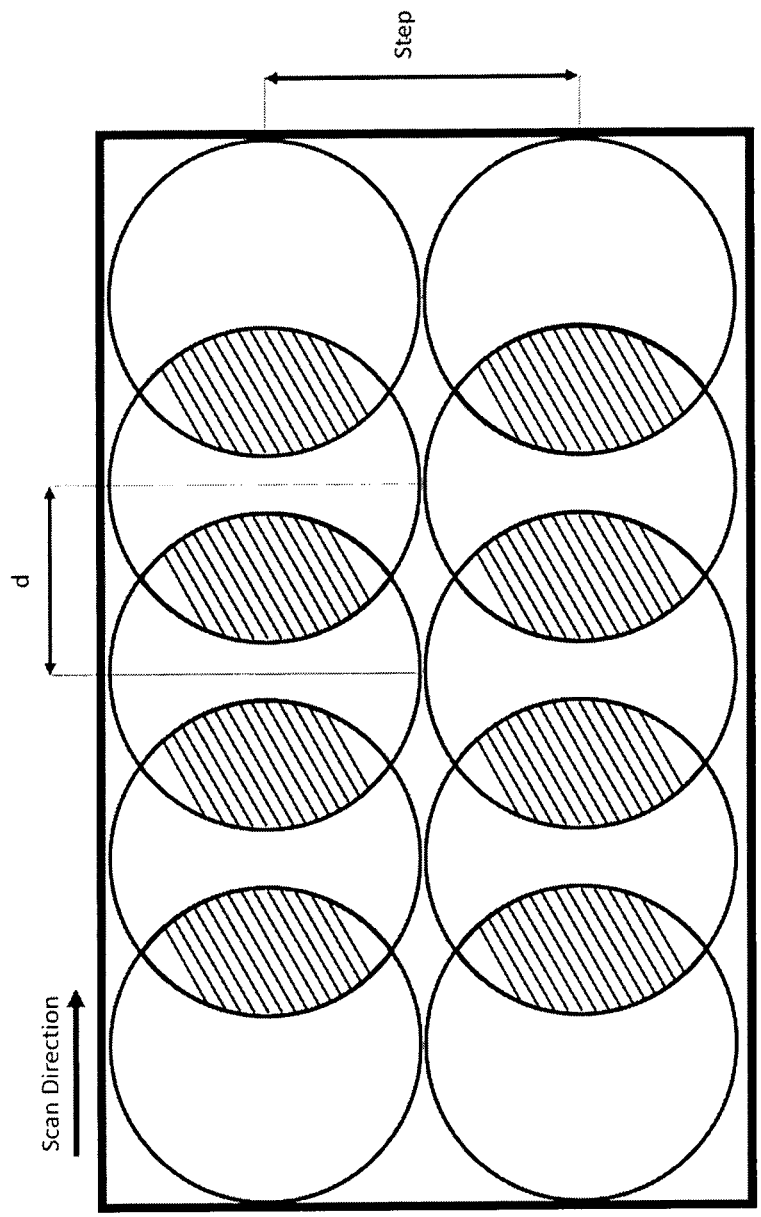
FIG. 4 schematically illustrates a representation of an area scan with Gaussian shape ultrafast laser pulses where the shaded areas are indicating an overlapping of spots.

Processing large surface areas introduce parameters which are important for the production of a smooth and clean nanostructured surfaces. FIG. 4 schematically illustrates a representation of an area scan with Gaussian shape ultrafast laser pulses where the shaded areas are indicating an overlapping of sports. Scanning speed is the speed where the stage move along an axis. Depending on the scanning speed, the distance d between the centers of two pulses is variable and defined as:

$$d = 2 \cdot \frac{v}{RR} \qquad \text{Eq. 1}$$

where v is scanning speed and RR the laser repetition rate. So the distance is proportionate to the scanning speed which leads to different overlapping as shown in FIG. 4. Another parameter is the step describing the distance between the irradiated lines as shown in FIG. 4. The step can be less than the spot diameter.

For three or higher number of pulses per spot area, nano-spikes are formed. Although due to the high overlap (between consecutive laser pulses) and therefore temperature is rising above the melting point on the surface, damage is likely to occur on small regions. Less than three number of pulses can be employed to minimize the damage areas. But for less than three pulses no structures are formed due to the lower pulse overlapping. Small number of pulses combined with multiple scans is the solution for this problem where the step is set near to spot diameter.

Figure 5:
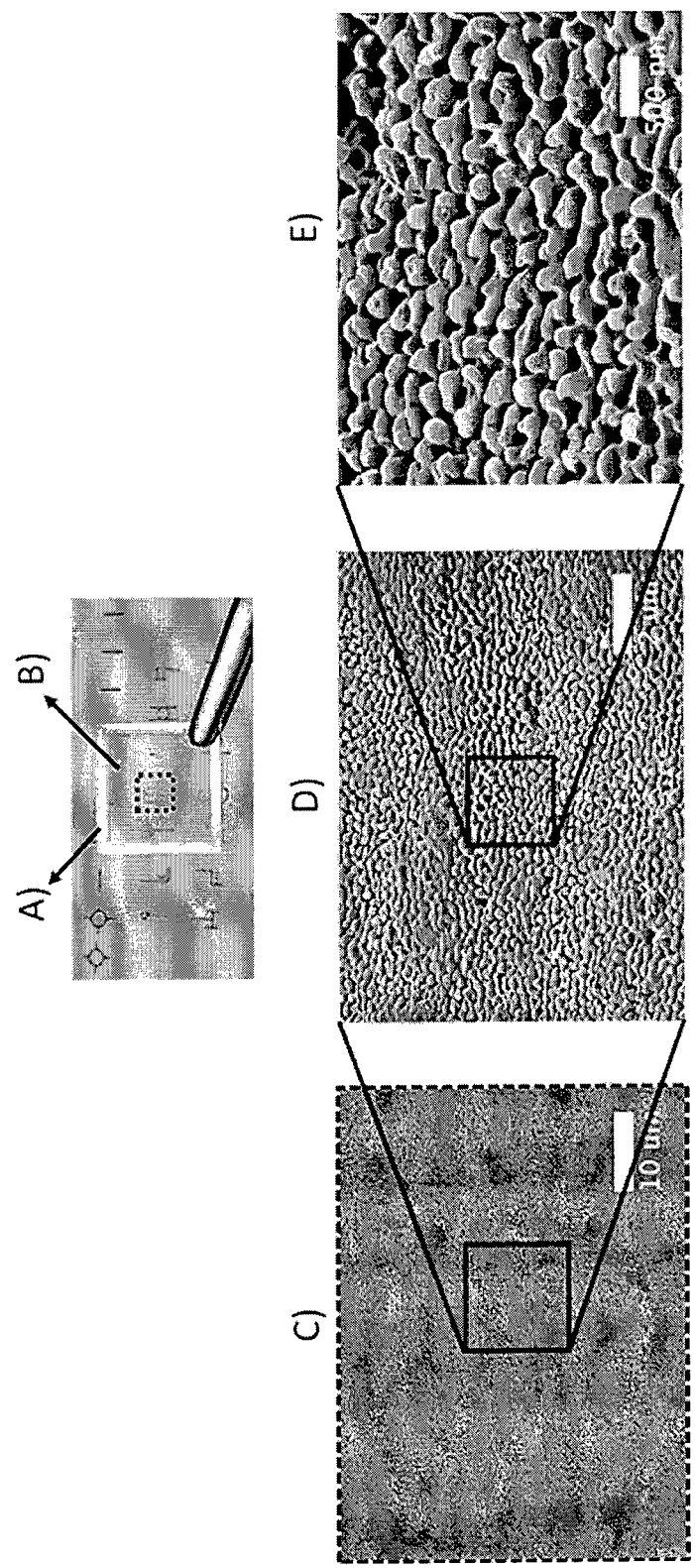
FIG. 5 schematically illustrates an antireflection transparent solid material shaped using a method of shaping, according to an example.
Figure 6A:
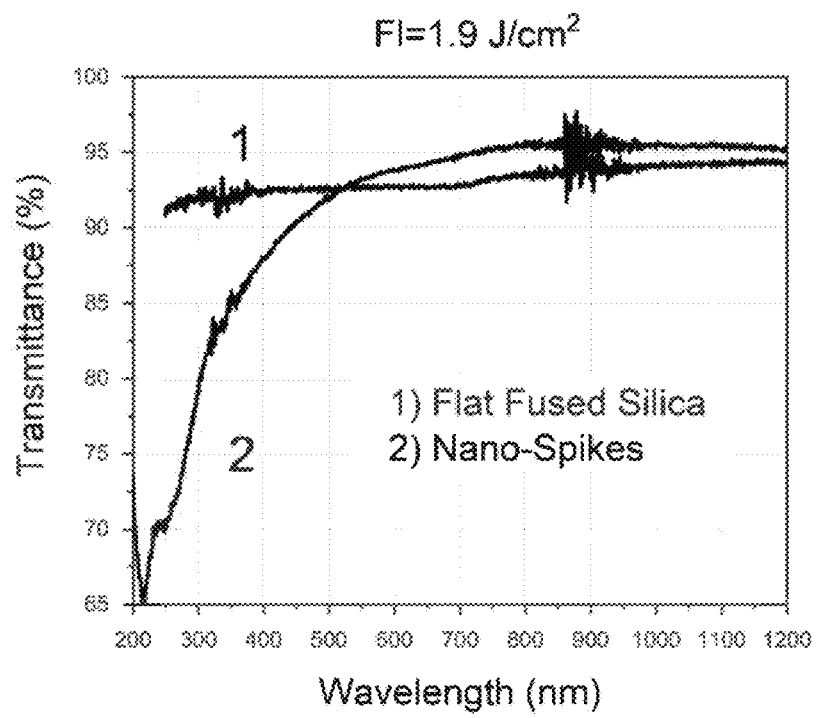
FIGS. 6A and 6B schematically illustrate transmittance and reflectance spectrum of Flat Fused silica and nanostructured Fused Silica surface.
Figure 6B:
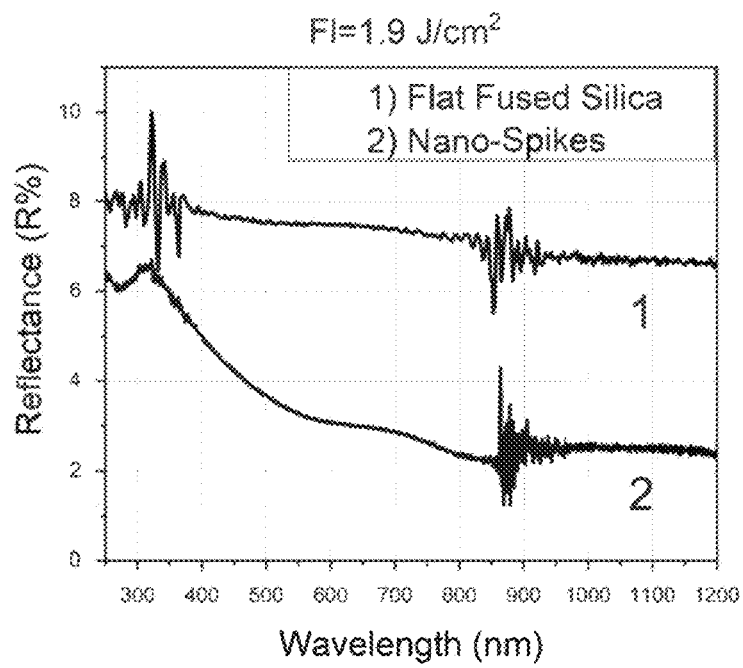
Figure 7:
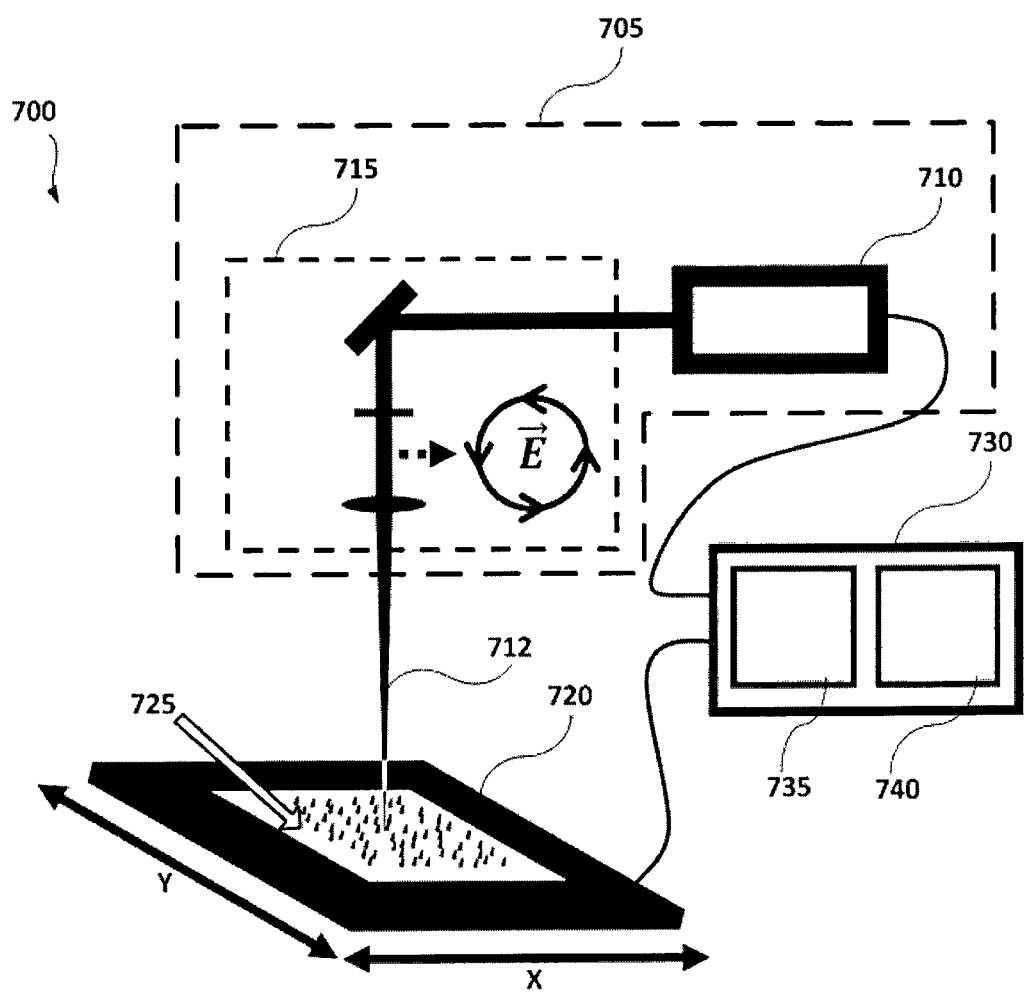
FIG. 7 schematically illustrates a manufacturing configuration according to an example.

Anti-reflection surfaces in the visible spectrum can be produced using this technique as shown in FIG. 5 and FIG. 6A-6B. FIG. 5 schematically illustrates an antireflection transparent solid material shaped using a method of shaping, according to an example. FIG. 6A and FIG. 6B schematically illustrate transmittance and reflectance spectrum, respectively, of Flat Fused silica and nanostructured Fused Silica surface. The reflective untreated flat frame of the transparent solid is demonstrated in FIG. 5 (A) while (B) shows the antireflective laser processed area where the material is placed under a white light source. FIG. 5 (C)-(E) are SEM images of an example fused silica surface with nanostructures (nano-spikes). The characteristics of nano-spikes formed on the surfaces are 200-400 nm periodicity, 60-100 nm radius and 200-300 nm height for three scan. In the first scan the height of the nano-spikes formed were 32±5% compared to the third scan and for the second scan their height was 85±10% compared to the third scan. Furthermore optical analysis shows that the material presents anti-reflection properties in the visible and near IR spectrum as shown in FIG. 6. Indeed, as shown in FIG. 6B, the anti-reflections properties are improved compared to the properties of the untreated surface as shown in FIG. 6A and this is accomplished by reducing the material reflectance in the spectral range from 250-1200 nm. At the same time the transmittance increases by 2-3% in the spectral range of 500-1200 nm, while in the UV region the transmittance decreases.

s FIG. 7 schematically illustrates a manufacturing configuration to shape a surface of a transparent solid material to reduce reflection in the optical spectrum according to an example. Manufacturing configuration 700 may comprise an irradiation module 705. The irradiation module 705 may include a pulsed laser source 710 to generate a laser beam and an optical system 715 for focusing a laser beam or pulse 712 from the pulsed laser source 710. The manufacturing configuration 700 may further comprise a holder 720 configured to hold the transparent solid material 725. A controller 730 may be coupled to the irradiation module 705 and to the holder 720. The controller 730 may comprise a memory 735 and a processor 740. The controller 730 may set a laser fluence value of the irradiation module 705 from a range of laser fluence values stored in the memory 735 and associated with the transparent solid material 725. Furthermore, the controller may set a laser pulse wavelength, a laser pulse repetition rate and a laser pulse duration from a range of laser pulse wavelengths, repetition rates and durations, respectively, similarly stored in the memory 735 and associated with the transparent solid material 725 as well as set a number of consecutive laser pulses applied per focus point spot on the laser surface based on the nanostructure pattern to be formed on the transparent solid material 725. Finally, the controller 730 may set a relative translation sequence of the transparent solid material, by e.g. controlling movement of the holder 720, during a laser exposure with a laser beam from the pulsed laser source 710 to generate a desired nanostructure two-dimensional antireflection pattern array on the surface of the transparent solid material 725.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

Further, although the examples described with reference to the drawings comprise computing apparatus/systems and processes performed in computing apparatus/systems, the invention also extends to computer programs, particularly computer programs on or in a carrier, adapted for putting the system into practice.

The invention claimed is:

1. A method of shaping a surface of a visibly transparent solid material to reduce reflection in the optical spectrum, comprising:
   providing the visibly transparent solid material on a holder;
   identifying a desired target nanostructure two-dimensional antireflection pattern array on the surface of the visibly transparent solid material;
   identifying a desired focus spot distribution on the surface of the visibly transparent solid material;
   identifying a melting temperature of the visibly transparent solid material;
   selecting a laser fluence value in a range of laser fluence values from 1.47 J/cm$^2$ to 3.8 J/cm$^2$ and approaching an ablation threshold of the material;
   selecting a wavelength, a repetition rate, and a pulse duration of a laser pulse from a range of wavelengths, a range of repetition rates from 1 kHz to 1 MHz, and a range of pulse durations, respectively;
   selecting a number of consecutive laser pulses applied per focus spot on the surface with a pulse separation in time from 1 ps to 1 ms;
   exposing the surface of the visibly transparent solid material in air to only circularly polarized laser radiation focused on the surface with the selected wavelength, pulse repetition rate pulse duration and number of consecutive laser pulses cooperating to raise the temperature of the visibly transparent solid material to approach the melting temperature of the visibly transparent solid material to shape at least a part of the surface and generate at least part of the desired target nanostructure two-dimensional pattern array, which includes nano-spikes having a height up to 300 nm; and
   relatively translating the visibly transparent solid material to generate the desired nanostructure two-dimensional pattern array to form a self-assembled pseudo-periodic surface structure that is antireflective in all plane directions, wherein the visibly transparent solid material comprises at least a glass piece and is transparent to visible light.

2. The method according to claim 1, wherein identifying the desired focus spot distribution on the surface of the visibly transparent solid material comprises identifying an overlap by a preselected percentage of neighboring focus spots.

3. The method according to claim 2, wherein the preselected percentage is 89% or lower.

4. The method of shaping according to claim 1, further comprising: scanning and/or rastering the laser beam on the stationary visibly transparent solid material.

5. The method of shaping according to claim 1, wherein shaping the visibly transparent solid material comprises shaping the glass piece on an electronic device, the electronic device including a solar cell (SC), a display, a screen, a light emitting diode (LED) and a sensor.

6. The method of shaping according claim 1, wherein the wavelength is selected from a range of 200 nm to 1100 nm.

7. The method of shaping according claim 1, wherein the pulse duration is selected up to 10 ps.

\* \* \* \* \*